United States Patent [19]
Sawai et al.

[11] Patent Number: 5,237,478
[45] Date of Patent: Aug. 17, 1993

[54] ROTARY HEAD DRUM UNIT

[75] Inventors: Jun Sawai; Hiroshi Kiriyama; Keisuke Hashimoto; Satoshi Maeda, all of Kanagawa, Japan

[73] Assignee: Sony Corporation, Tokyo, Japan

[21] Appl. No.: 727,435

[22] Filed: Jul. 9, 1991

[30] Foreign Application Priority Data

Jul. 10, 1990 [JP] Japan ................................ 2-182250

[51] Int. Cl.$^5$ ........................................... G11B 15/61
[52] U.S. Cl. ........................................... 360/130.24
[58] Field of Search ............... 360/130.24, 85, 130.22, 360/130.23, 107

[56] References Cited

U.S. PATENT DOCUMENTS

| | | | |
|---|---|---|---|
| 4,719,528 | 1/1988 | Sato | 360/130.24 |
| 4,833,562 | 5/1989 | Kochi et al. | 360/130.24 |
| 4,959,743 | 9/1990 | Kochi et al. | 360/130.24 |
| 5,008,769 | 4/1991 | Kaneko et al. | 360/130.24 |

FOREIGN PATENT DOCUMENTS

| | | |
|---|---|---|
| 3118241 | 11/1982 | European Pat. Off. |
| 3545804 | 7/1986 | European Pat. Off. |
| 3802276 | 8/1989 | European Pat. Off. |
| 58-148757 | 6/1983 | Japan |

OTHER PUBLICATIONS

Patent Abstracts of Japan, vol. 12, No. 214 (P-718) (3061) Jun. 18, 1988 and JP-A-63 010 312 (Toshiba) Jan. 16, 1988.

Primary Examiner—A. J. Heinz
Assistant Examiner—Kevin M. Watkins
Attorney, Agent, or Firm—Alvin Sinderbrand; William S. Frommer

[57] ABSTRACT

A rotary head drum unit for a recording/reproducing apparatus comprises a stationary upper drum provided at its lower end with a taper surface for biasing a magnetic tape downward, a stationary lower drum provided in its circumference with a helical tape lead or guide surface to guide the lower edge of a tape helically extended across the upper and lower drums, and rotary heads inserted between the upper and lower drums. At least a portion of the taper surface of the upper drum in a lead-out region near a position where the magnetic tape departs from the rotary head drum unit is a helical taper section extended helical substantially in parallel to the helical tape lead or guide surface of the lower drum. The taper surface having the helical taper section is able to bias the magnetic taper downward in the lead-out region so that the lower edge of the magnetic tape is guided securely by the helical tape guide surface of the lower drum and keeps the upper edge of the magnetic tape taut through the entire arc of contact of the magnetic tape with the rotary head drum unit, so that the magnetic tape is secured for stable running.

3 Claims, 7 Drawing Sheets

F I G. 4A
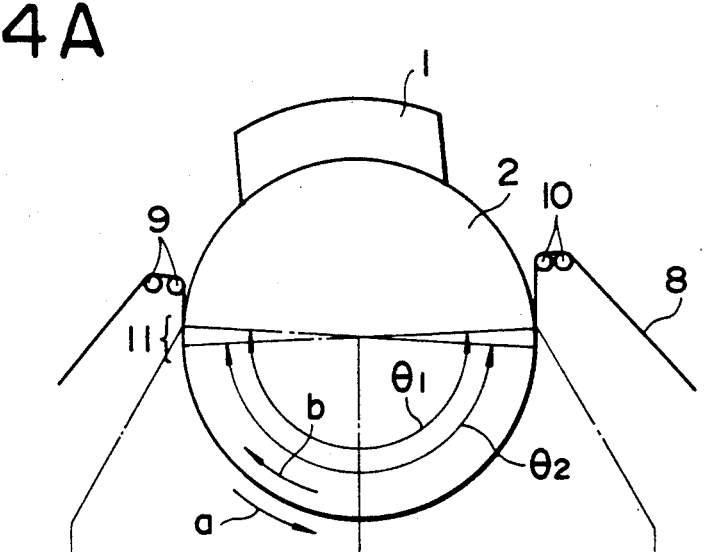
F I G. 4B
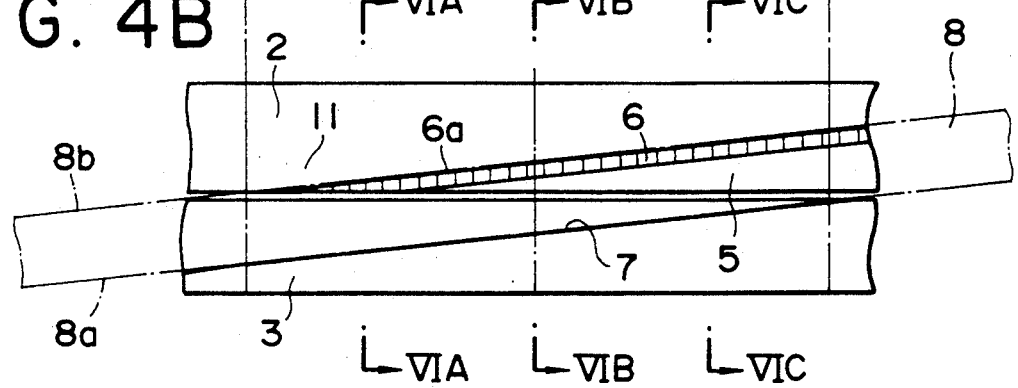
F I G. 5
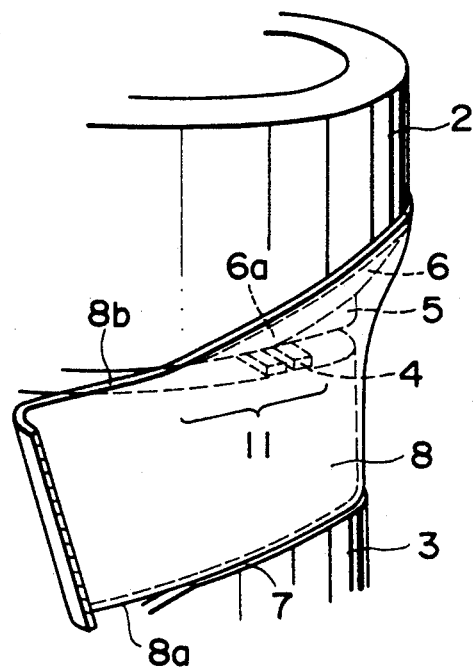

ROTARY HEAD DRUM UNIT

BACKGROUND OF THE INVENTION

1. Field of the Invention

The present invention relates to a rotary head drum unit having stationary upper and lower drums, to be applied to a recording/reproducing apparatus, such as a VTR.

2. Description of the Prior Art

The applicant of the present patent application has previously proposed a rotary head drum unit for a VTR in Japanese Utility Model Laid-open (Kokai) No. Sho 62-73337. As shown in FIGS. 7 to 10C, in this previously proposed rotary head drum unit, a plurality of rotary heads 4, i.e., magnetic heads, are inserted between an upper drum 2 and a lower drum 3 fixedly connected to each other by a drum post 1 (FIG. 8). A rotary flange, not shown, for rotatively driving the rotary heads 4 is disposed coaxially with the upper drum 2 and the lower drum 3. The diameter of the upper drum 2 is greater than that of the lower drum 3. A taper surface 6 is formed in the lower portion of the upper drum 2, and a reduced portion 5 of a diameter equal to that of the lower drum 3 is formed contiguously with the lower end of the taper surface 6. The taper surface 6 and the reduced portion 5 are symmetrical with respect to the axis of the upper drum 2. A helical tape lead or guide surface 7 is formed in the circumference of the lower drum 3. A magnetic tape 8 is guided by a lead-out guide 9 and a lead-in guide 10 (FIG. 8) so as to extend helically across the upper drum 2 and the lower drum 3 with the lower edge 8a thereof guided by the tape lead or guide surface 7. The arc $\theta_1$ of contact between the rotary head drum unit and the magnetic tape 8 is, for example, about 188° and the data recording angle $\theta_2$ of the rotary heads 4 is, for example, about 178°.

In recording data on or reproducing recorded data from the magnetic tape 8 by rotating the rotary heads 4 in the direction of the arrow a at a high rotating speed while the magnetic tape 8 runs in the direction of the arrow b, the magnetic tape 8 is biased downward by the taper surface 6 of the upper drum 2 so that the lower edge 8a of the magnetic tape 8 slides along the tape lead or guide surface 7 as the magnetic tape 8 runs.

As is obvious from FIGS. 10A, 10B and 10C showing longitudinal sections of the rotary head drum unit at different angular positions, respectively, since a portion of the upper drum 2 having the taper surface 6 extends in a plane perpendicular to the axis of the upper drum 2, the vertical position of the magnetic tape 8 moves downward relative to the taper surface 6 as the magnetic tape advances. Since the portion of the upper drum 2 having the taper surface 6 extends in a plane perpendicular to the axis of the upper drum 2 whereas the magnetic tape 8 runs obliquely to the taper surface 6, the upper edge 8b of the magnetic tape 8 deviates completely downward from the taper surface 6 in a lead-out region 11 near a departing position where the magnetic tape 8 departs from the rotary head drum unit. Accordingly, the taper surface 6 is unable to urge the magnetic tape 8 downward in the lead-out region 11 and, consequently, the lower edge 8a of the magnetic tape 8 is liable to separate upward from the tape lead or guide surface 7 and the magnetic tape 8 is liable to run unstably. In the lead-out region 11 near the departing position, a portion of the magnetic tape 8 near the upper edge 8b is liable to slack (FIG. 9) and, consequently, the magnetic tape 8 is liable to be in faulty contact with the rotary head 4.

OBJECT AND SUMMARY OF THE INVENTION

Accordingly, it is an object of the present invention to provide a rotary head drum unit having a tape lead or guide surface and capable of controlling a magnetic tape so as to be guided properly by the tape lead even in a lead-out region near a position where the magnetic tape departs from the rotary head unit.

In accordance with one aspect of the present invention, a rotary head drum unit which comprises a stationary upper drum provided in its lower end with a taper surface for biasing a magnetic tape downward, a stationary lower drum provided in its circumference with a helical tape lead or guide surface to guide the lower edge of a tape helically extended across the upper and lower drums, and rotary heads inserted between the upper and lower drum; is characterized in that at least a portion of the taper surface of the upper drum in a lead-out region near a departing position where the magnetic tape departs from the rotary head drum unit is extended helically substantially in parallel to the helical tape lead or guide surface.

The rotary head drum unit thus constructed is able to make a tape run with its upper edge sliding along the taper surface of the upper drum even in the lead-out region, so that the taper surface is able to bias the tape securely toward the tape lead or guide surface of the lower drum even in the lead-out region. Since the upper portion of the tape near the upper edge of the same is continually in sliding contact with the taper surface of the upper drum even in the lead-out region, the upper portion of the tape is kept taut while the tape runs along the rotary head drum unit.

BRIEF DESCRIPTION OF THE DRAWINGS

The above and other objects, features and advantages of the present invention will become more apparent from the following description taken in connection with the accompanying drawings, in which:

FIG. 4A is a plan view of a modification of the rotary head drum unit of FIG. 1A;

FIG. 4B is a development of the circumference of the rotary head drum unit of FIG. 4A;

FIG. 5 is a fragmentary perspective view of a portion of the rotary head drum unit in the vicinity of the lead-out region;

DESCRIPTION OF THE PREFERRED EMBODIMENTS

Figure 1A:
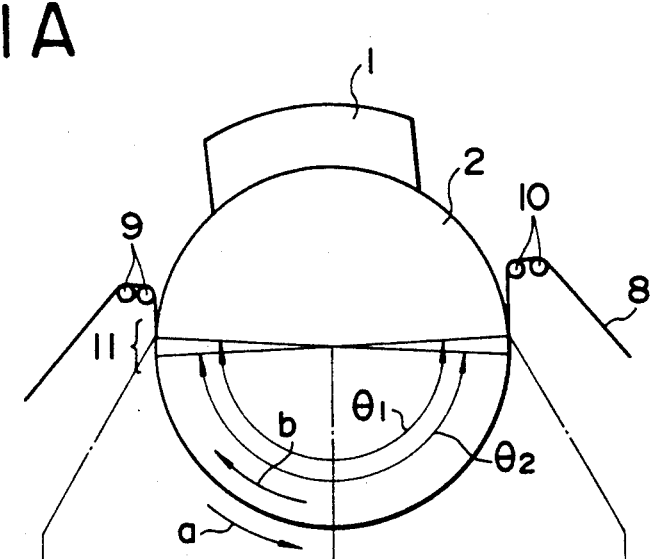
FIG. 1A is a plan view of a rotary drum head unit in a preferred embodiment according to the present invention.
Figure 1B:
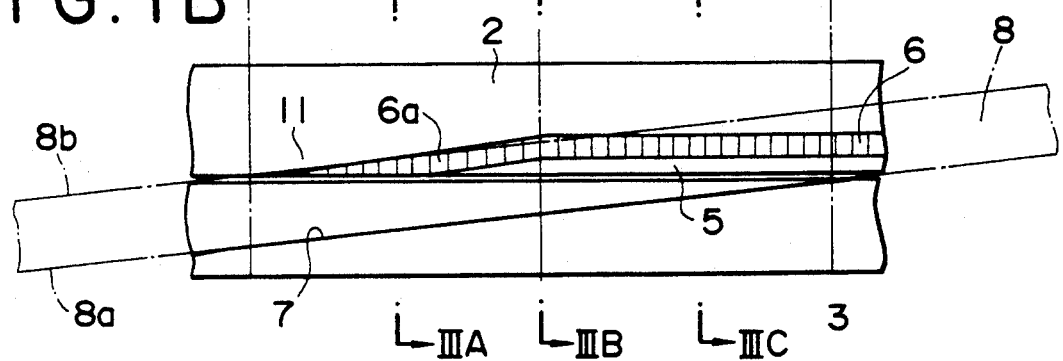
FIG. 1B is a development of the circumference of the rotary head drum unit.
Figure 2:
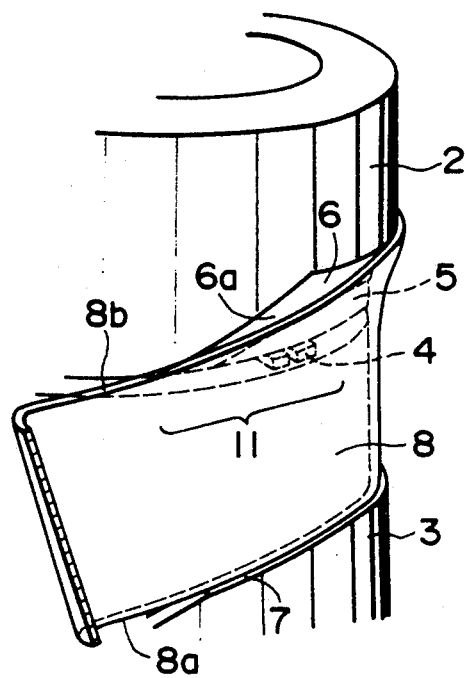
FIG. 2 is a fragmentary perspective view of a portion of the rotary head drum unit in the vicinity of a lead-out region near a departing position where a magnetic tape departs from the rotary head drum unit.
Figure 3A:
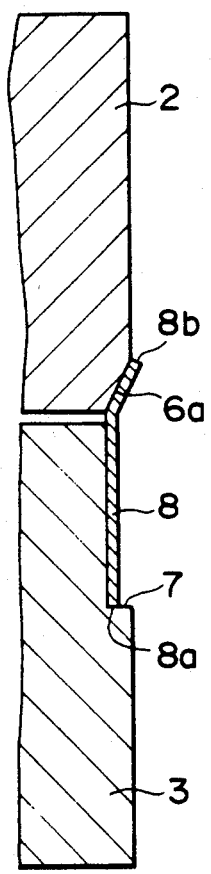
FIGS. 3A, 3B and 3C are sectional views taken on line IIIA—IIIA, line IIIB—IIIB and line IIIC—IIIC, respectively, in FIG. 1B.
Figure 3B:
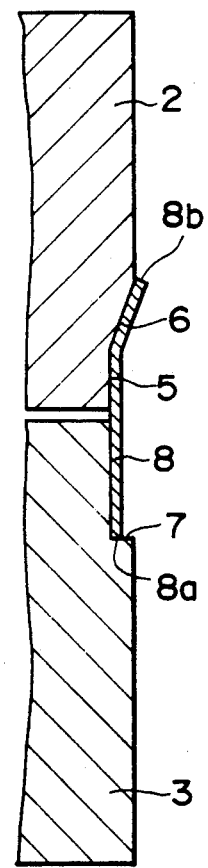
Figure 3C:
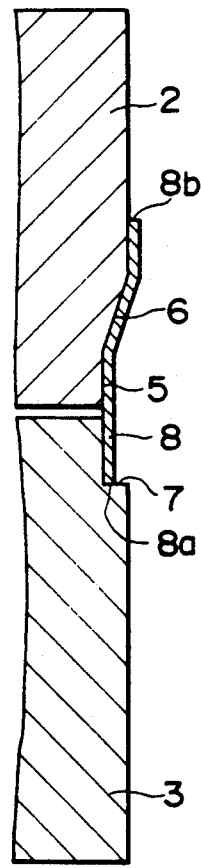

A rotary head drum unit in a preferred embodiment according to the present invention will be described hereinafter as applied to a VTR with reference to FIGS. 1A to 6C, in which parts like or corresponding to those shown in FIGS. 7 to 10C are denoted by the same reference characters and the description thereof will be omitted to avoid duplication.

Referring to FIGS. 1A to 3C, a rotary head drum unit in a preferred embodiment according to the present invention has an upper drum 2 provided in its lower end with a taper surface 6 having a helical taper section 6a in a lead-out region 11 near a departing position where a magnetic tape 8 departs from the rotary head drum unit. The helical taper section 6a extends in parallel to a helical tape lead or guide surface 7 formed in the circumference of a lower drum 3. The helical taper section 6a is declined toward the departing position in parallel to the helical tape lead or guide surface 7 in a region between a position shown in FIG. 3B and a position shown in FIG. 3A. A section of the taper surface 6 between a position shown in FIG. 3B and a position shown in FIG. 3C extends in a plane perpendicular to the axis of the upper drum 2.

Figure 6A:
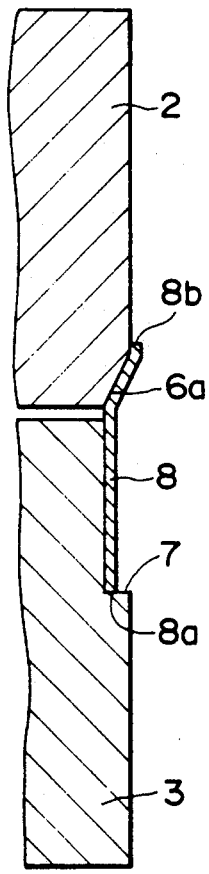
FIGS. 6A, 6B and 6C are sectional views taken on line VIA—VIA, line VIB—VIB and on line VIC—VIC, respectively, in FIG. 4.
Figure 6B:
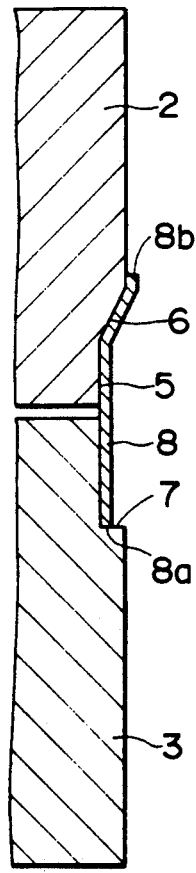
Figure 6C:
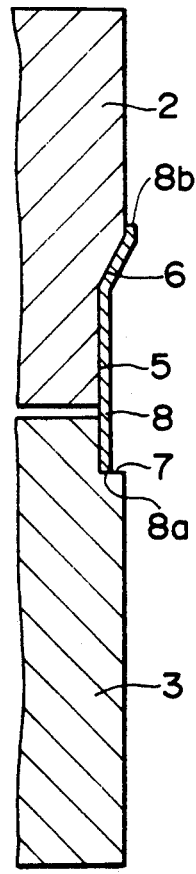
Figure 7:
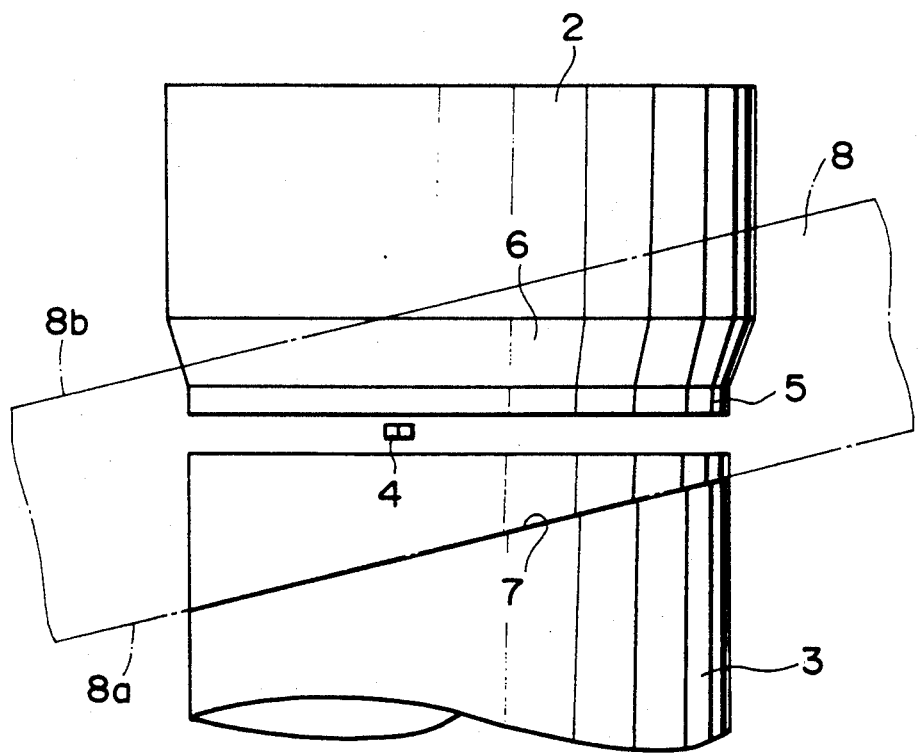
FIG. 7 is a front view of a known rotary head drum unit.
Figure 8A:
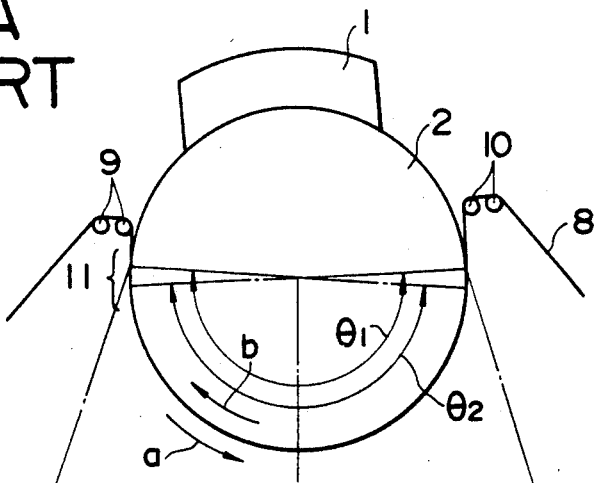
FIG. 8A is a plan view of the rotary head drum unit of FIG. 7.
Figure 8B:
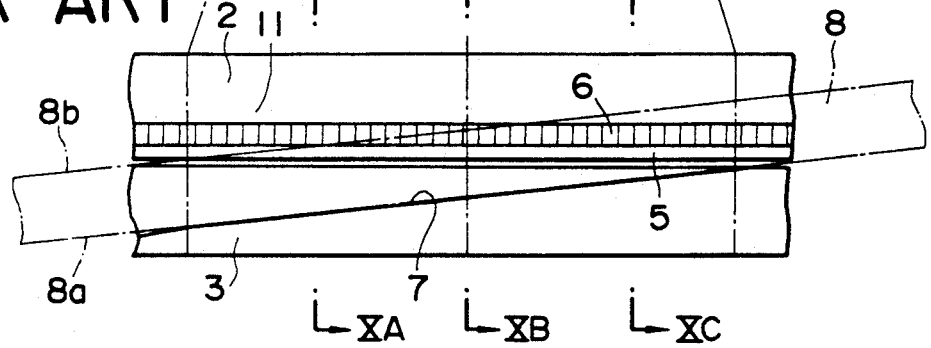
FIG. 8B is a development of the circumference of the rotary head drum unit of FIG. 7.
Figure 9:
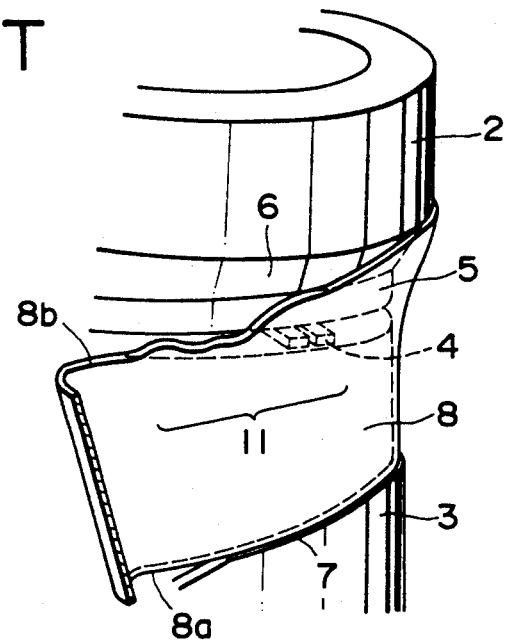
FIG. 9 is a fragmentary perspective view of a portion of the rotary head drum unit of FIG. 7 in the vicinity of a lead-out region.
Figure 10A:
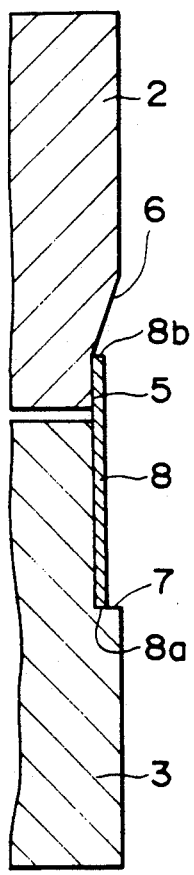
FIGS. 10A, 10B and 10C are sectional views taken on line XA—XA, line XB—XB and line XC—XC, respectively, in FIG. 7.
Figure 10B:
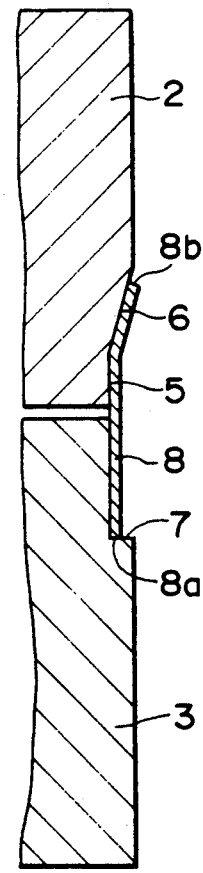
Figure 10C:
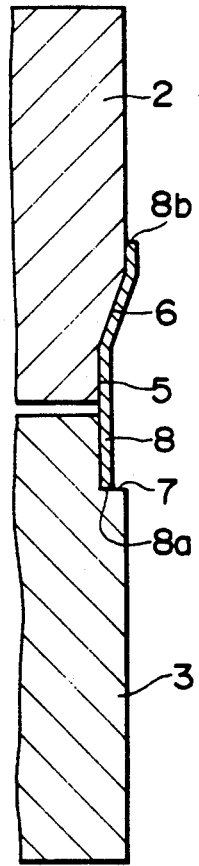

In a rotary head drum unit in a modification shown in FIG. 4 to 6C, the upper drum 2 is provided in its lower end with a helical taper surface 6 extending in parallel to a helical tape lead or guide surface 7 formed in the circumference of the lower drum 3 through the entire arc $\theta_1$ of contact between a magnetic tape 8 and the rotary head drum unit. The portion of the upper drum 2 provided with the helical taper surface 6 is declined toward the lead-out region in parallel to the tape lead 7 of the lower drum 3 as shown in FIGS. 6A to 6C.

In either the rotary head drum unit shown in FIG. 1A or the rotary head drum unit shown in FIG. 4, the upper portion of the magnetic tape 8 near the upper edge 8b of the same slides along the helical taper section 6a of the helical taper surface 6 parallel to the helical tape lead 7 in the lead-out region 11, so that the helical taper section 6a or the helical taper surface 6 is able to bias the magnetic tape 8 securely toward the helical tape lead or guide surface 7 so that the lower edge 8a of the magnetic tape 8 is guided by the helical tape lead 7 to secure the magnetic tape 8 for stable running.

Since the upper edge 8b of the magnetic tape 8 is in sliding contact with the helical taper section 6a or the helical taper surface 6 in the lead-out region 11, the upper portion of the magnetic tape 8 near the upper edge 8b of the same is continually kept taut while the magnetic tape 8 is running, so that faulty contact between the magnetic tape 8 and the rotary head 4 due to slack in the upper portion of the magnetic tape 8 near the upper edge 8b of the same can be obviated. Since the helical taper section 6a in contact with the upper portion of the magnetic tape 8 near the upper edge 8b of the same varies gradually with respect to the radial direction, the helical taper section 6a does not affect the contact between the magnetic tape 8 and the rotary head 4 adversely at all.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A rotary head drum unit for a recording/reproducing apparatus, comprising:

a stationary lower drum provided in its circumference with a helical tape guide surface facing upwardly for guiding the lower edge of a magnetic tape;

a stationary upper drum fixedly connected to the lower drum, and provided at its lower end portion with a taper surface; and rotary heads inserted between the upper and lower drums;

characterized in that the taper surface of the upper drum has a helical taper section extending in parallel to the helical tape guide surface of the lower drum in a lead-out region near a position where the magnetic tape departs from the lower drum.

2. A rotary head drum unit according to claim 1, wherein a diameter of the upper drum above said taper surface is greater than a diameter of the lower drum, and a diameter of the lower end of said taper surface is equal to said diameter of the lower drum.

3. A rotary head drum unit according to claim 1, wherein said upper and lower drums are fixedly disposed in a recording/reproducing apparatus.

* * * * *